United States Patent [19]

Farrell

[11] Patent Number: 4,480,633
[45] Date of Patent: Nov. 6, 1984

[54] SOLAR ENERGY APPARATUS

[76] Inventor: Daniel L. Farrell, 328 Plumer Ave., Pittsburgh, Pa. 15202

[21] Appl. No.: 385,762

[22] Filed: Jun. 7, 1982

[51] Int. Cl.³ .............................................. F24J 3/02
[52] U.S. Cl. .................................... 126/417; 126/429; 126/444; 126/450; 126/DIG. 2; 52/531
[58] Field of Search ............... 126/417, 450, 444, 428, 126/449, 429, 431; 52/18, 123 R, 521, 522, 536, 553, 531

[56] References Cited

U.S. PATENT DOCUMENTS

| 246,626 | 9/1881 | Morse . | |
|---|---|---|---|
| 330,917 | 11/1885 | Northrop . | |
| 2,559,870 | 7/1951 | Gay | 237/1 |
| 2,642,968 | 6/1953 | Roush et al. | 189/86 |
| 2,777,549 | 1/1957 | Roebuck | 189/86 |
| 3,054,223 | 9/1962 | O'Brien | 50/268 |
| 3,394,520 | 7/1968 | Skelton | 52/521 |
| 3,918,430 | 11/1975 | Stout et al. | 126/271 |
| 4,029,080 | 6/1977 | Warren | 126/270 |
| 4,046,133 | 9/1977 | Cook | 126/270 |
| 4,069,809 | 1/1978 | Strand | 126/270 |
| 4,073,282 | 2/1978 | Schriefer | 126/270 |
| 4,076,015 | 2/1978 | Mattson | 126/271 |
| 4,077,393 | 3/1978 | Mattson | 126/271 |
| 4,111,188 | 9/1978 | Murphy | 126/271 |
| 4,120,282 | 10/1978 | Espy | 126/270 |
| 4,148,296 | 4/1979 | Parlato | 126/450 X |
| 4,178,911 | 12/1979 | Mattson | 126/449 |
| 4,221,208 | 9/1980 | Murphy, Jr. | 126/DIG. 2 |
| 4,222,368 | 9/1980 | Rost et al. | 126/438 |
| 4,271,819 | 6/1981 | Farrell | 126/431 X |
| 4,296,736 | 10/1981 | Soot | 126/438 |
| 4,327,708 | 5/1982 | Taylor | 126/DIG. 2 |

FOREIGN PATENT DOCUMENTS 872817 7/1961 United Kingdom ................. 52/522

Primary Examiner—Larry Jones
Attorney, Agent, or Firm—Arnold B. Silverman

[57] ABSTRACT

A solar energy structure which includes translucent panel members which may be generally V-shaped. Through panel configuration and interlocks the solar energy is permitted to pass through the panel structure which also serves to provide thermal insulation. It also provides an air envelope to the building surface to which it is attached. The structure may be made up of extruded members and is attached to the supporting structure with a floating type arrangement to permit thermal expansion and contraction to occur. The generally V-shaped panels contain closed air spaces and attach one-to-another with a male/female relationship.

15 Claims, 9 Drawing Figures

SOLAR ENERGY APPARATUS

BACKGROUND OF THE INVENTION

1. Field of the Invention

This invention relates to solar energy assemblies which are adapted to provide decorative and functional means for collecting radiant solar energy and, more specifically, it is directed toward unique panel constructions adapted for such purposes.

2. Description of the Prior Art

Various forms of functional and decorative building construction components positioned on building exteriors such as vertical exterior walls and roofs have been known for years. Not only has it been known to provide decorative wall coverings for the interior, but various forms of exterior siding have been known. See, for example, U.S. Pat. Nos. 2,642,968, 2,777,549, 3,054,223 and 3,394,520.

As a result of the shortage of energy on a worldwide basis, more and more effort is being directed toward more efficient use of existing energy supplies. For example, in order to conserve our coal, gas and oil reserves more emphasis has been placed upon maintaining of residential and commercial structures at reduced temperatures in cold weather and providing increased thermal insulation to minimize heat loss. There has also been a great deal of emphasis directed toward the use of solar energy in heating of buildings, heating of hot water and other uses.

U.S. Pat. No. 3,918,430 discloses a hot water solar system adapted for use on a roof or other portion of a building. A plurality of water channels are housed within a rigid frame underlying a series of layers of plastic material.

U.S. Pat. No. 4,029,080 discloses a thermal collector for a solar energy system. The prime thrust of this disclosure is directed toward an air system adapted for use on a roof.

U.S. Pat. No. 4,069,809 discloses a solar system wherein a series of building blocks have transparent members for permitting passage of the sun's rays therethrough. The series of blocks provides a vertical air channel passing immediately behind the transparent window in each block and a series of three generally vertically oriented passageways positioned within each block remote from the front transparent window.

U.S. Pat. No. 4,120,282 discloses a solar system consisting of a number of fixed flat plate solar reflectors and collectors.

U.S. Pat. No. 4,073,282 discloses a solar collecting system wherein a matrix of expanded sheets having large openings is employed to collect the sun's radiant energy. Means are provided for circulating air through the chambers and into contact with the slit and expanded sheets.

U.S. Pat. Nos. 4,076,015 and 4,077,393 each disclose systems wherein modular elements provide a plurality of raised surfaces for receipt of the sun's rays as used in combination with raised reflective surfaces. Among the problems encountered with known solar collecting systems are the somewhat unsightly nature of the same and, in some instances, the expense of installing the same.

My prior U.S. Pat. No. 4,271,819, the disclosure of which is incorporated herein by reference, discloses a multipiece solar energy system.

There remains a need for a solar collecting system for exterior walls, roofs and other portions of buildings which is both decorative and functional. There is a further need for such systems which can be applied readily to pre-existing buildings as well as buildings designed and constructed with the solar energy system in mind.

SUMMARY OF THE INVENTION

As used herein directional language such as "out", "up", "down", "in", other forms of these words and any other directional language shall, unless the specific usage expressly indicates to the contrary, refer to position relative to other components in the radiant solar apparatus as distinguished from absolute directions. For example, in a vertical wall, the direction "upwardly" from a first lower panel to a second upper panel would be angularly upwardly. In the context of the present disclosure in the absence of an express indication to the contrary both of these examples would constitute one panel being positioned upwardly with respect to the other.

The term "panel" shall refer to a building component positioned generally exteriorly of the building regardless of whether it is employed on a vertical wall as siding, on a roof, or in other locations and shall also expressly include use on structural members attached to or adjacent to buildings such as a patio enclosure, for example, and uses more remote from buildings such as fences, for example.

The term "foreign matter" shall refer to infiltration moisture, as well as other liquid and solid materials, the entry of which into the building or panel assembly would be undesirable in respect of efficiency of performance of the solar system or would be undesirable in respect of aesthetic considerations or would be otherwise desirable.

The present invention has met the above-described need and has provided a number of improvements over the prior art. The present invention provides a substrate means to which solar panels are secured. An elongated translucent, hollow generally V-shaped panel is secured to the substrate means with the apex of the panel being disposed outwardly. Additional translucent panel members may be provided to establish a series of generally V-shaped closed air spaces which are translucent. End closures cooperate with the panel members to define a closed air space. Energy receiving means are disposed inwardly of the panel assembly in order to permit the sun's rays impinging upon the panel assembly to pass therethrough and be received thereby.

It is an object of the present invention to provide a decorative and functional solar panel assembly which can be economically made and installed.

It is another object of this invention to provide such a panel assembly which permits ready passage of solar energy therethrough while resisting loss of heat to the building exterior by providing a series of closed air spaces.

It is another object of this invention to provide such panels in interlocked, sealed relationship so as to resist the entry of foreign matter into the building interior.

It is another object of the present invention to provide a siding or roof shingle panel assembly wherein undesired vibrations due to wind currents are resisted.

It is another object of the present invention to provide such panel assemblies which will not appreciably increase the weight load on the building in comparison to the load experienced with many known prior art solar systems.

It is another object of the present invention to provide a durable panel assembly which does not conduct heat or electricity and will not interfere with radio or television reception.

It is yet another object of this invention to provide such a panel assembly which can be made from a fireproof, or self-extinguishing material which does not require painting in order to remain attractive.

It is another object of this invention to provide such a panel assembly which can expand and contract due to thermal changes.

It is another object of this invention that the solar panel assembly can be of either vertical, horizontal or at any other angle to suit the application.

These and other objects of this invention will be more fully understood from the following description of the invention on reference to the illustrations appended hereto.

DESCRIPTION OF THE PREFERRED EMBODIMENTS

Figure 1:
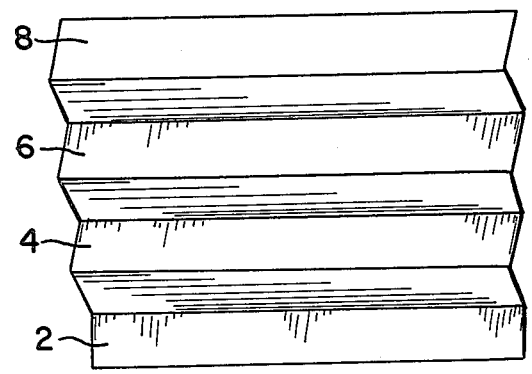
FIG. 1 is a fragmentary front elevational view showing a portion of a panel assembly of the present invention.

Referring now more specifically to FIG. 1, there is shown apparatus for collecting radiant solar energy in accordance with the present invention. A starter member 2 is secured to the substrate (not shown in this view) directly or through the interposed means. A series of three panels 4, 6, 8 which in the form shown are of generally V-shaped configuration were provided. The panels 4, 6, 8 are directly or indirectly secured to the substrate and to the vertically adjacent panel or starter member.

Figure 2:
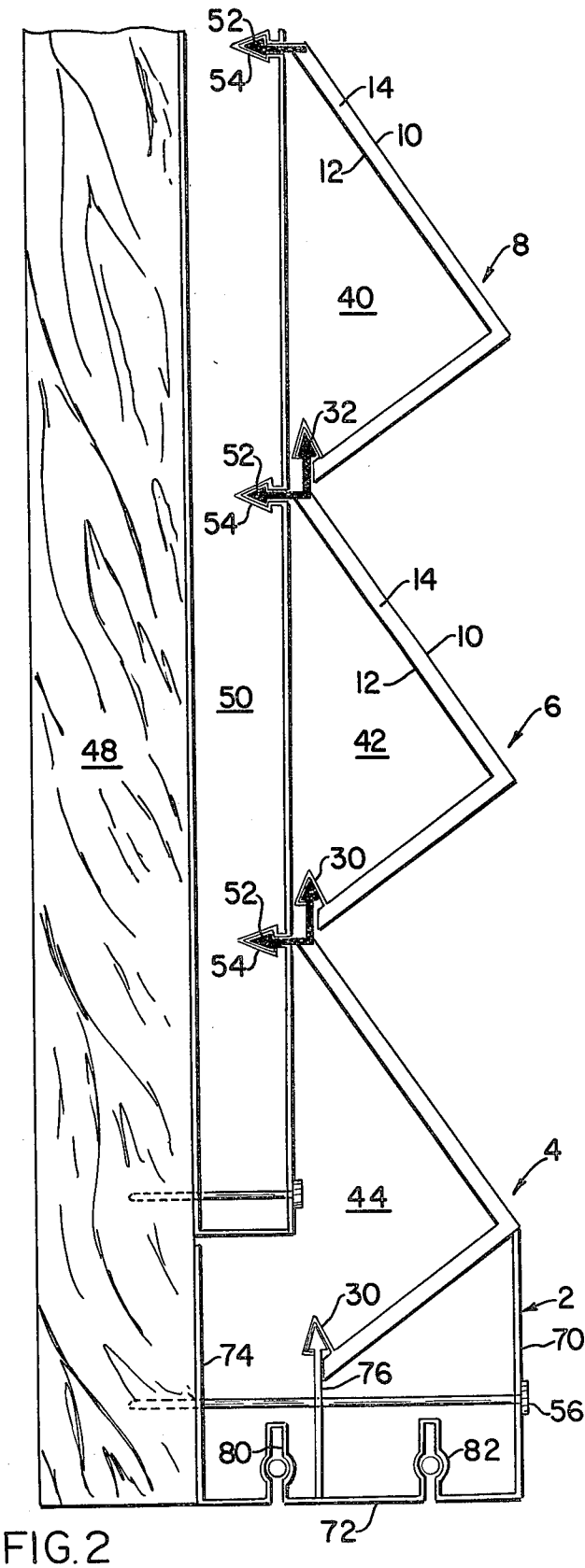
FIG. 2 is a left side elevational view of the assembly of FIG. 1.

Referring now more specifically to FIG. 2, there is shown a solar panel assembly including the panels 4, 6, 8 made of translucent material. The panels advantageously may be made of a resinous plastic material and manufactured by extrusion.

Figure 3:
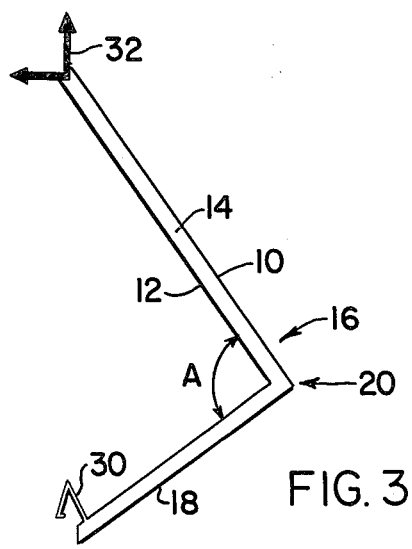
FIG. 3 is an end elevational view of a panel of the present invention.
Figure 4:
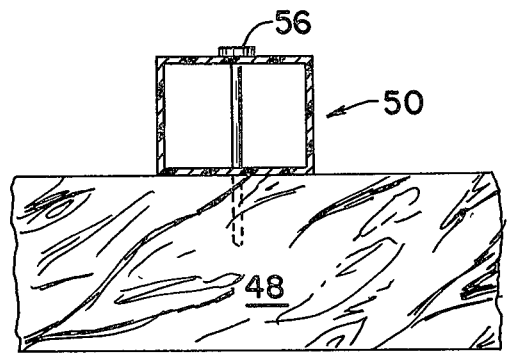
FIG. 4 is a cross-sectional view of the furring member of the present invention.
Figures 5, 6:
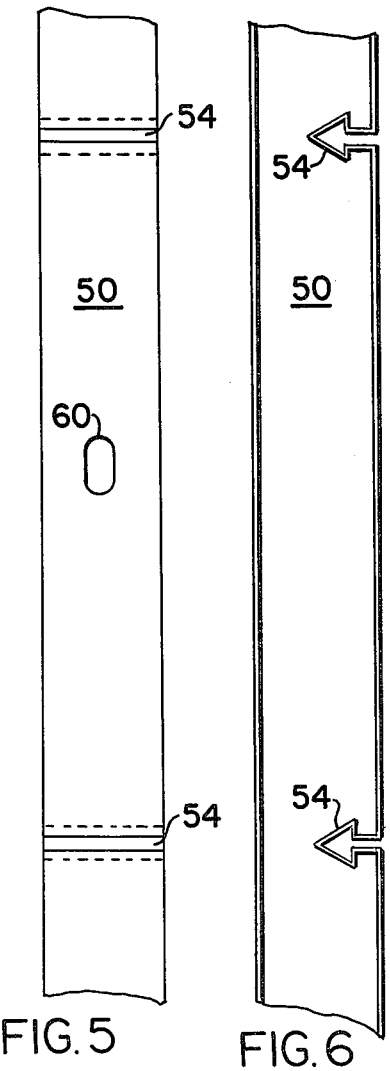
FIG. 5 is a front elevational view of a furring member of the present invention.
FIG. 6 is a side elevational view of the furring strip of FIG. 5.

As shown in FIGS. 2 and 3, the panel has a outer wall 10, spaced from an inner wall 12 by a dead air space 14. The upper and lower extremities are sealed. The panel is, in the form shown, preferably generally V-shaped with an upper leg 16 meeting a lower leg 18 at corner 20. The upper leg 16 is preferably longer than the lower leg 18 in order to permit the included angle A (which is preferably about 80°–100°) to permit a horizontally positioned panel to get maximum solar exposure.

At the lower end of the panel, preferably at or adjacent the free end of leg 18 will be a first locking member 30 and at the upper end of the panel at or adjacent the free end of leg 16 will be a second locking member 32.

The unit height of the main solar member maybe designed generally to correspond with that of other commercially sold housing siding, however the unit height can be varied to suit the application desired.

With the assembly shown in FIG. 2, the sun's rays will pass through the translucent panels 4, 6, 8 and heat the air in zones 40, 42, 44. The air spaces 14 provide thermal insulation resisting loss of heat to the regions disposed exteriorly of the assembly.

As is shown in FIG. 2, the panels 4, 6, 8 are secured to the substrate 48 by means of a series of generally vertically oriented furring strips 50. The panels 4, 6, 8 have inwardly projecting male members 52 which are preferably coextensive with the panels and are mechanically engaged in grooves or female portions 54 of the stud 50. As in all male/female connections of the invention it is preferred to have the male member provided with a forward pilot surface to facilitate insertion and a rear shoulder to resist removal.

Referring to FIGS. 2 and 4–6 there are shown details of a preferred furring strip 50. The strip 50 may be a hollow plastic extrusion which is of rectangular shape. The furring strips will generally be spaced about 16 to 24 inches on center. By providing openings in the substrate 48, each pair of furring strips 50 will cooperate with the heated air chambers 40, 42, 44 to define duct-like members for transmitting the heated air to the building interior. The furring strip 50 has integrally formed female grooves 54 for receiving the male portion 52 of the panels.

Nail slots 60 are also provided to permit engagement of nails 56 permitting relative vertical sliding movement responsive to thermal expansion and contraction. The furring strips 50 may be extruded with secondary machine operations to provide expansion slots 60 used to attach with nails 56 or other means of securing the vertical furring strips 50 to the substrate 48, and other secondary machine operations to cut horizontal slots across at regular spaced intervals to provide a female attaching means 54 to accept the male attaching means 52 of the panels. The machined slots 60 let the furring strips expand or contract generally in a vertical direction. The horizontal machined slots 54 allow the panel to expand or contract generally in a horizontal direction.

Figure 7:
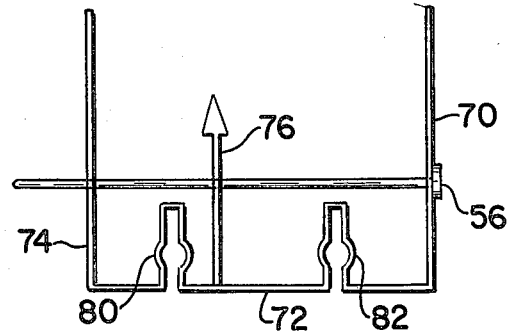
FIG. 7 is an end view of an end or bottom member of the present invention.

Referring now to FIGS. 2 and 7, the starter member 2 will now be considered in greater detail. It is of generally channel shaped configuration with a front wall 70, bottom wall 72 and rear wall 74. An upwardly projecting male member 76, in the form shown, projects from the bottom wall 72 and engages female member 30 of panel 4 substantially continuously along the length of the members 30, 76. A nail 56 secures the starter member 2 to substrate 48. The starter member 2 also has a pair of female recesses 80, 82 which permit the starter member 2 to function as corner end caps for closing the panel ends to define the closed air space 14. The female recesses 80, 82 are preferably substantially coextensive with the starter member 2.

Figure 8:
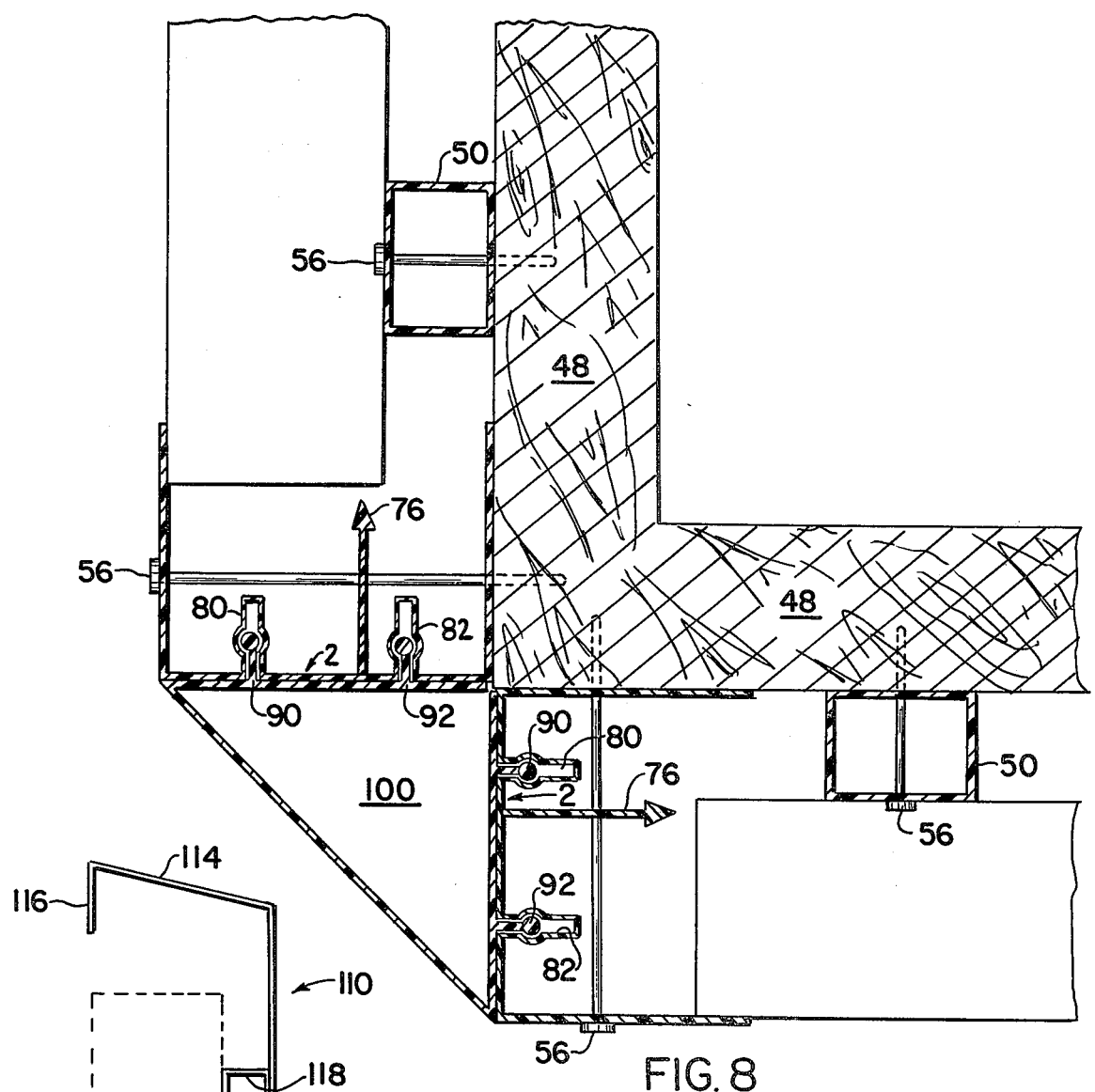
FIG. 8 is a cross-sectional view of a corner construction of the present invention.

Referring to FIG. 8, there is shown a cross section of a corner. Corner assembly member 100 cooperating with a pair of starter members functioning as end closures. The corner assembly member 100 is preferably a hollow triangular extrusion generally coextensive in length with the adjacent starter members. It has two extruded male attaching means 90, 92 on each of two surfaces which are generally about 90 degrees apart. These engage female members 80, 82, respectively. The extruded male attaching means 90, 92 also may be attached to the member 2 to complete an inside corner.

Figure 9:
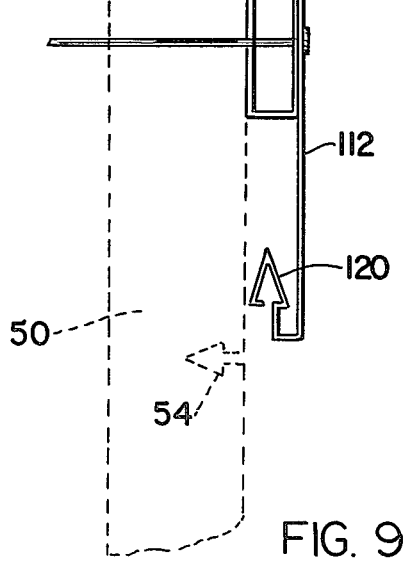
FIG. 9 illustrates a top portion of the assembly.

FIG. 9 illustrates a top member 110 which serves to cover the top panel. It is preferably substantially continuous with the panels and has a front wall 112, an upper wall 114 which terminates in a rear flange 116 and an integrally formed spacer 118. A female recess 120 will receive the male locking means of the uppermost panel.

In creating the assembly, the furring strips 50 are first attached generally vertically, spaced about 16 to 24 inches on center. The starter member 2 is then installed at the lower end of the wall. The panels, end pieces and corners may then be installed followed by the top member. If desired, a moisture absorbing material may be placed into air spaces 14 before sealing the panel.

The extruded parts referred to in the above figures are preferably made of the same translucent resinous plastic material so that thermal expansion or contraction is equal for all components.

When the solar panel assembly is applied to a building wall or roof the furring strips 50 provide a vertical duct to transport the solar energy by means of air flow away from the substrate to which the solar panels are attached. This separation provided by the vertical furring strips 50 also provides an air envelope to further insulate the building to which the solar panel assembly is attached.

While the panels of the present invention serve to provide an inexpensive, highly efficient solar energy system while also providing an aesthetically, pleasing exterior covering for a building or portion thereof, it will be appreciated that the panel elements may be made of a wide range of materials such as translucent plastic materials, for example.

It will be appreciated that the manufacture of these materials may be economically effected and that assembly of elongated panels permit reduction in the amount of labor required to cover a given area with the panel assembly. As the panels are lightweight, no significant additional weight loading to the structure is made as a result of the panel assembly being employed.

It will be appreciated that in the preferred embodiments of the invention the panels will be made as a unit through extrusion and will be substantially continuous and of uniform cross-sectional area throughout their longitudinal extent.

While it is essential that the material be translucent to the extent that it permits efficient passage of solar radiant energy therethrough, the panels may be made with varying degrees of translucency including being transparent if desired.

While the panels are adapted for use on a wide range of building exterior surfaces, it will be appreciated that they may most advantageously be employed as building siding or roofing panels or shingles. It will also be noted that as a result of the sloping nature of the panel assembly, the panel will tend to resist undesired accumulation of ice and snow thereon.

While, for the convenience of illustration, reference has been made herein to the use of nails as fastening means, it will be appreciated that a wide variety of other types of fastening means including screws and staples for example, may readily be employed to secure the vertical furring strips to the substrate.

It will be appreciated, therefore, that the present invention provides an economical means of establishing an effective solar energy collector system which is both functionally effective and decorative. This system provides efficient collection of solar energy, while providing a decorative exterior facade. A series of dead air spaces provides thermal insulation against the loss of heat to the exterior of the building. The vertical furring strips provide a path for air movement and collection of the solar energy, while also providing an air envelope for the building or part thereof to which the solar panel assembly is installed. The elongated panels facilitate establishing sealed panel assemblies without requiring the use of highly skilled labor. Panel assemblies resist the undesired entry of foreign matter into the interior and cooperate with various forms of means to transfer heat to building heating, hot water heating or other uses. Painting and other decorative or protective coatings need not be provided. It may be employed in existing structures or designed as a portion of new constructions.

Finally, if desired, the relative positions of the male and female members which cooperate to form a joint may be reversed.

Whereas particular embodiments of the invention have been described above for purposes of illustration, it will be evident to those skilled in the art that numerous variations of the details may be made without departing from the invention as defined in the appended claims.

I claim:

1. Apparatus for collecting radiant solar energy comprising
    substrate means for securing solar panels directly or indirectly thereto,
    at least one elongated translucent solar panel having a lower leg and an upper leg meeting at an apex disposed outwardly of said substrate means,
    each said panel having an outer translucent wall and an inner translucent wall having at least a portion spaced from said outer walls,
    end closure means cooperating with said panel to define a closed air space, and
    means for securing said panels, whereby radiant energy impinging upon said solar panel will pass through said outer translucent wall, said closed air space and said inner translucent wall.

2. The apparatus of claim 1 wherein said panel are of generally V-shaped configuration.

3. The apparatus of claim 2 wherein
    said securing means including furring strips,
    said furring strips are anchored to said substrate means, and
    said panels are secured to said furring strips.

4. The apparatus of claim 3 wherein
    said securing means includes mechanical means for effecting securement of said panels.

5. The apparatus of claim 2 wherein
    at least two said panels are provided with one in generally overlying relationship with respect to the other, and
    said panels being composed of a resinous plastic material.

6. The apparatus of claim 5 wherein
    one leg of a said panel terminating in a male locking element, and
    the other leg of said panel terminating in a female locking element.

7. The apparatus of claim 5 wherein
said upper leg is longer than said lower leg.
8. The apparatus of claim 6 wherein
adjacent said panels are mechanically secured to each other by interengagement of a said male locking element of one panel with a said female locking element.
9. The apparatus of claim 8 wherein
said male and female locking elements are integrally formed within said panels.
10. The apparatus of claim 1 wherein
female locking means are formed in either said furring strips or said panels,
male locking means are formed in the other of said furring strips or said panels, and
said panels are secured to said furring strips by interengagement of said male and said female locking means.
11. The apparatus of claim 1 including
said end closure means being generally channel shaped.
12. The apparatus of claim 11 wherein
said end closure means has at least one first locking member, and
a corner member having a second locking member engaging said first locking member.
13. The apparatus of claim 11 wherein
said end closure means has a male member projecting generally toward the opening in said channel, whereby said end closure means may function as a starter member.
14. The apparatus of claim 12 wherein
said first locking member is a female member and said second locking member is a male member.
15. The apparatus of claim 1 wherein
each of said panels are of substantially uniform cross-sectional configuration throughout its longitudinal extent.

* * * * *